US 6,741,429 B1

(12) United States Patent
Baglin et al.

(10) Patent No.: US 6,741,429 B1
(45) Date of Patent: May 25, 2004

(54) ION BEAM DEFINITION OF MAGNETORESISTIVE FIELD SENSORS

(75) Inventors: John Edward Eric Baglin, Morgan Hill, CA (US); Liesl Folks, Mountain View, CA (US); Bruce Alvin Gurney, San Rafael, CA (US); Bruce David Terris, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 09/669,030

(22) Filed: Sep. 25, 2000

(51) Int. Cl.[7] .................................. G11B 5/39
(52) U.S. Cl. .................................... 360/313
(58) Field of Search ........................ 360/313, 314, 360/315, 324, 324.1, 324.11, 324.12, 324.2, 325, 326, 327

(56) References Cited

U.S. PATENT DOCUMENTS

| | | | |
|---|---|---|---|
| 5,079,662 A | | 1/1992 | Kawakami et al. |
| 5,327,313 A | * | 7/1994 | Nishioka et al. ............ 360/322 |
| 5,550,101 A | * | 8/1996 | Nagata et al. .............. 505/162 |
| 6,077,618 A | * | 6/2000 | Sakakima et al. .......... 428/693 |
| 6,162,582 A | * | 12/2000 | Hsiao et al. ................ 430/312 |
| 6,219,206 B1 | * | 4/2001 | Odai et al. .................. 360/320 |
| 6,297,938 B1 | * | 10/2001 | Niijima ....................... 360/317 |
| 6,317,302 B1 | * | 11/2001 | Van Kesteren et al. . 360/327.32 |
| 6,392,852 B1 | * | 5/2002 | Sasaki .......................... 360/320 |
| 6,404,603 B1 | * | 6/2002 | Inoue et al. ................. 360/320 |
| 6,424,508 B1 | * | 7/2002 | Tadokoro et al. ......... 360/324.2 |
| 6,496,333 B1 | * | 12/2002 | Han et al. ................... 360/315 |
| 6,525,903 B1 | * | 2/2003 | Sasaki ......................... 360/126 |

OTHER PUBLICATIONS

Yimin Guo et al. in "Low Fringe–Field and Narrow–Track MR Heads", IEEE Transactions on Magnetics, vol. 33, No. 5, Sep. 1997, pp. 2827–2829.

G.J. Athas et al. "Focused Ion Beam System for Automated MEMS Prototyping and Processing", Proc. SPIE—Int. Soc. Opt. Eng. (USA), vol. 3223, 1997, pp. 198–207.

Charles Partee et al., "Off–Track Response Versus Shield Width at the ABS for MR Heads", IEEE Transactions on Magnetics (USA), vol. 33, No. 5, Pt. 1, Sep. 1997, pp. 2887–2889.

W.M. Kaminsky et al., "Patterning Ferromagnetism in $Ni_{80}Fe_{20}$ Films via 30 keV $Ga^+$ on Irradiation", Applied Physics Letters, Mar. 30, 2000.

\* cited by examiner

Primary Examiner—David L. Ometz
(74) Attorney, Agent, or Firm—Lumen Intellectual Property Services, Inc.

(57) ABSTRACT

A magnetoresistive (MR) sensor can be shaped using ion beam irradiation and/or implantation through a mask introduced between a MR structure and an ion source. The mask covers selected portions of the MR structure to define the track width of the sensor. Ion irradiation and/or implantation reduces the magnetoresistance of the unmasked portions while leaving the masked portion substantially unaltered. The mask can be a photoresist mask, an electron beam resist mask, or a stencil mask. Alternatively the mask may be part of a projection ion beam system. Track width resolution is determined at the mask production step. The edges of the sensor can be defined by a highly collimated ion beam producing an extremely straight transition edge, which reduces sensor noise and improves sensor track width control. Improved hard bias layers that directly abut the sensor may be used to achieve a suitable stability. A variety of longitudinal bias schemes are compatible with ion beam patterning.

12 Claims, 8 Drawing Sheets

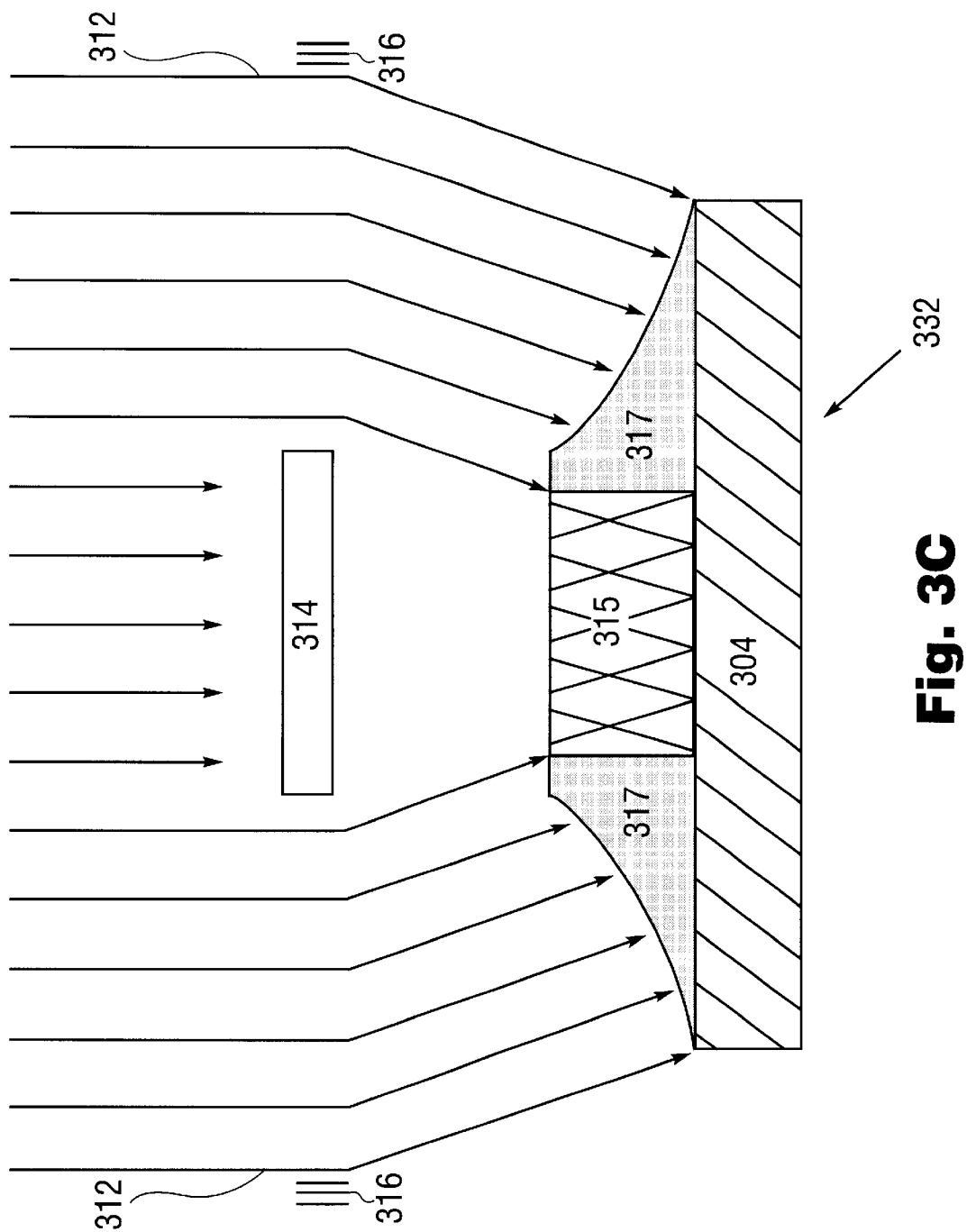

ION BEAM DEFINITION OF MAGNETORESISTIVE FIELD SENSORS

FIELD OF THE INVENTION

This invention relates generally to forming magnetoresistive field sensors. More particularly, this invention relates to magnetic recording systems.

BACKGROUND ART

Sensors for detecting and measuring magnetic fields find many scientific and industrial applications. For example, a magnetic recording head typically includes a sensing element that senses a magnetic flux emanating from a recording medium. The magnetic field changes some physical property of the sensing element in a manner that depends on the magnitude and direction of the magnetic field. A sensing element that changes its electrical resistivity in response to a magnetic field is usually referred to as a magnetoresistive field sensor. Prior magnetoresistive field sensors typically include one or more ferromagnetic elements whose resistivity changes in response to magnetic flux. Prior magnetoresistive field sensors include anisotropic magnetoresistive (AMR) sensors and giant magnetoresistive. (GMR) sensors, in which a sense current flows along, or perpendicular to, planes of the ferromagnetic elements. Prior magnetoresistive field sensors also include magnetoresistive tunnel junction (MTJ) sensors, in which a sense current flows perpendicular to the planes of the ferromagnetic elements through a dielectric barrier. Resistance of a magnetoresistive field sensor varies as the square of the cosine of the angle between the magnetization in the sensor and the direction of sense current. Recorded data can be read from a magnetic medium because the external magnetic field from the recorded magnetic medium (the signal field) causes a change in the direction of magnetization in the sensor, which in turn causes a change in resistance in the sensor and a corresponding change in the sense current or voltage.

Increasing areal density of magnetic storage media requires that the magnetic recording and reading heads be able to operate at ever-decreasing track widths (TW). Both the write element and the magnetic readback sensor of the recording head must be made smaller in order to achieve narrower data tracks. The width of the recorded track is determined by, among other parameters, the width of the write pole of the write head and the flying height of the write head. The size and geometry of the shields and leads also play a role in determining achievable track width for a given recording head design.

In order to take advantage of the narrower write track width, it is imperative that the read track width of the readback element or read head be reduced as well. At present, magnetoresistive (MR) heads are typically made by photolithographically defining the sensor element from a continuous multilayer thin film. The sensor, which is frequently rectangular in shape, is often defined in two steps, one photolithographic step to define the TW dimension, and one lapping step to define the so-called "stripe height" (SH) dimension. Unfortunately, due to practical limitations of the lithographic method, such as the diffraction limit of light, it is not easy in a manufacturing environment to produce read heads much narrower than about 200 nm. Meanwhile, MR head technology is already pushing present photolithographic techniques to their limits and these present methods will not be able to accommodate future generations of MR heads. For example, in current commercial products, the sensor TW, which is defined by optical lithography and ion beam milling, is typically less than 1 $\mu$m. It is envisaged that in order to make heads suitable for recording densities of 100 Gbits/in$^2$, the sensor TW will need to be around 0.13 $\mu$m, but current lithography is wavelength-limited to around 0.2 $\mu$m.

An associated problem that arises from the current processing method is poor shape definition, which leads to a "tail" on each side of the sensor. The tails are a result of the ion beam milling process commonly used to define TW. The milling is performed with the ion beam at an angle to the wafer in an effort to minimize the redeposition of magnetic material at the mask edges, which would have a deleterious effect on the sensor performance. However, ion milling at an angle creates a shadow near the mask edges, within which the milling is less efficient, resulting in tails on the sensor structure. The beam divergence from the ion mill also contributes to the tails. The presence of the tails degrades the magnetic performance of the sensor. Further, the tails may vary in dimension and form across the wafer, resulting in sensor-tosensor variation in performance. FIG. 1 illustrates a cross-sectional schematic diagram of a contiguous junction design MR sensor 100. MR sensor 100 includes a first magnetic shield 102, and a first insulating gap 104 disposed on the shield 102. The sensing element 106 including tails 108 is disposed on the gap 104. Following the milling process, the top of the multilayer sensing element 106 will have a width determined by the resist mask used. However, the all-important sense layer, which is located further down in the multilayer stack that forms sensing element 106, will inevitably have a larger and possibly not well-controlled width. This problem is predicted to become increasingly important as the TW decreases and the tails become proportionally larger relative to the sensor dimensions.

Once the sensing element 106 is formed using optical lithography and milling, it is usual to deposit a ferromagnetic layer, called "hard bias" layer 110, with substantial magnetic coercivity (Hc) on each side of the sensing element 106 to stabilize the magnetization at each side of the sensing element, thereby improving sensor performance. However, the tails 108 on each side of the sensing element 106 make deposition of a uniform hard bias layer 110 difficult, and the hard bias layer 110 becomes very thin near the top surface of the sensing element 106 and/or does not closely abut the sensing element 106, leading to poor sensor performance.

MR sensor 100 further includes leads 112 adjacent to hard bias layers 110 to conduct the sense current to the sensing element 106 when reading data stored on a magnetic recording medium, a second gap 114 and a second shield 115 to protect the sensing element 106.

A U.S. patent application entitled "Track Width Control of Readback Element" field Jun. 30, 1999, to Patrick C. Arnett et al. discloses a method for reducing the track width of readback elements by implantation of ions. The ion implantation reduces the magnetoresistance of the selected portions of the readback elements. The ion implantation of Arnett et al. is performed by a focused ion beam (FIB) technique. However, FIB processing is slow, since each element is processed in series, which is not desirable for mass manufacture of magnetic sensors. Furthermore, electrostatic discharge (ESD) damage can occur during the application of the FIB to the sensor element, and therefore grounding during processing and low ion currents will be required to minimize this risk. In addition, the FIB processing of Arnett et al. is performed from the air-bearing surface (ABS). The layers that make up the sensor typically run perpendicular to the ABS and have stripe heights about an order of magnitude or more greater than the sensor film thickness. Consequently the ions must penetrate to a greater depth than the sensor film thickness in order to define the magnetically sensitive "tip portion". A large depth requirement demands high ion energies (incidentally, well beyond the range of standard FIB machines). The increased ion energy will cause an increase in the lateral straggle of the ions in the sensor material, and will widen the transition region between the tip portion and the neighboring "magnetically deactivated" region, presumably degrading the performance of the sensor. In order to conduct "implantation" amounting to a typical few atomic percent of the critical layers, this technique requires extremely large ion doses with long processing times, resulting in problems with heat dissipation and surface sputtering. Furthermore, this technique teaches an implantation based on a geometry which is quite unlike that used in recording heads or other MR sensors.

An article entitled "Patterning Ferromagnetism in $Ni_{80}Fe_{20}$ Films via 30 keV $Ga^+$ Ion Irradiation" submitted to Applied Physics Letters on Mar. 30, 2000 by W. M. Kaminsky et al. discloses a method to degrade and even destroy the ferromagnetism of a GMR multilayer system, such as $Ni_{80}Fe_{20}/Cu/Ni_{80}Fe_{20}/Ni_{80}Cr_{20}$, by exposing this GMR multilayer system to homogeneous 30 keV $Ga^+$ implantation. $Ga^+$ implantation destroys all appearances of ferromagnetism at room temperature. The degradation of ferromagnetism occurs primarily because of ion implantation. Kaminsky et al. describe FIB irradiation of a single layer film to fashion a laterally patterned multilayer system. Such an approach would work for patterning the film from the ABS level to produce a read-back sensor. However, this is impractical for mass production of magnetic sensors for the reasons discussed above. Additionally, the lateral scattering of the implanted ions in the material is too great to produce implanted regions sufficiently narrow, and with sufficiently perfect interfaces, to allow a magnetoresistive sensor to be produced which would produce signals competitive with those from thin film sensors.

U.S. Pat. No. 5,079,662 issued on Jan. 7, 1992 to Kawakami et al. discloses a compound magnetic head in which the read element is sandwiched between the poles of the write gap. This patent has mentioned the ion implantation into selected areas of recording heads. However, the ion implantation is performed to increase the coercive field in those areas.

There is a need, therefore, for a MR recording head having improved definition of patterned magnetic sensors and a method of fabricating same.

OBJECTS AND ADVANTAGES

Accordingly, it is a primary object of the present invention to provide a MR sensor with improved shape definition.

It is a further object of the invention to provide a MR sensor with controlled track width.

It is a further object of the invention to provide a MR sensor with well-controlled biasing for magnetic stabilization.

It is an additional object of the invention to provide a method for fabricating such a MR sensor.

SUMMARY

These objects and advantages are attained by MR sensors with small track widths defined using ion irradiation and/or implantation at the wafer level.

According to a first embodiment of the present invention, a MR structure has a sensor defined by ion irradiation and/or implantation through a mask introduced between the film and the ion source at the wafer level. The unmasked portions of the MR structure are irradiated or implanted with ions, which reduces the magnetoresistance of the unmasked portions. However, materials of the unmasked ion-treated portions are still electrically conductive, which may be used as the lead, or part of the lead structure. Irradiation, as used herein, is distinguished from implantation in that ions irradiating a layer of material have sufficient energy to pass through the layer without being embedded in the layer. Furthermore, the irradiating ions have sufficient energy that they pass through the layer without significant sputtering or milling of the layer.

The mask may be a photolithographic resist mask located in contact with the surface of the magnetoresistive (MR) structure to cover selected portions of the MR structure and it is sufficiently thick to stop the ions incident on those regions, preventing them from reaching the MR structure. The unmasked portions are exposed to ion beams for patterning the sensor and reducing the magnetoresistance of the unmasked portions while leaving the masked portions, which define the track widths, magnetoresistive. Alternatively, an electron beam resist mask may be used. A designed TW may be achieved depending on the size of the resist mask used in irradiation and/or implantation process. Fabrication of a MR sensor using a resist mask allows for track width as small as 5 nm.

As an alternative to a resist mask, a stencil mask may be suspended above the surface of a MR structure during ion irradiation and/or implantation. The stencil mask may be produced using photolithography, electron-beam lithography, or other appropriate techniques. By choosing suitable ions and energies to minimize sputtering, the stencil mask may be used repeatedly, thus the cost of producing the mask is of small importance to manufacturing.

Alternatively, the sensor of a MR structure may be defined by ion irradiation and/or implantation using a projection ion beam system. In the projection ion beam system, a collimated ion beam is projected through a mask, which is disposed between the MR structure and an ion source. The ion beam is focused by beam optics after passing through the mask. A design TW may be achieved depending on the distance between the mask and the surface of the MR structure, the properties of the beam optics, and the size of features in the mask.

According to a second embodiment of the present invention, the magnetization of defined sensors of the types as described in the first embodiment may be stabilized by using a hard bias layer adjacent to the sensor. Alternatively, the magnetization of the defined sensor may be stabilized by using an anti-parallel (AP) pinning layer or an in-stack anti-ferromagnetic (AF) layer.

The methods of using ion implantation/irradiation for reducing the magnetoresistance and magnetic moment of the unmasked portions described in the first embodiment may be used for AMR, GMR and MTJ sensors. The magnetoresistance of a typical NiMn-based multilayer MR structure falls to around 3% of the as-grown value with an ion dose of $10^{16}$ ions/cm$^2$. However, although the ion irradiation reduces the magnetoresistance of the unmasked portions, the magnetic moment of those portions is not substantially altered. Ion implantation with suitable species reduces the magnetic moment and the magnetoresistance of the unmasked portions to zero. The magnetoresistance of typical spin valve samples drops rapidly from around 10% to near zero with increasing dose of implanted ions. The total moment of the films drops to zero after about four monolayers equivalent coverage of ions (about $2 \times 10^{16}$ ions/cm$^2$).

MR heads having defined sensors of the types as described in the first and second embodiments may be incorporated into a disk drive according to a third embodiment of the present invention. The disk drive includes a magnetic recording medium, a MR head with a defined sensor, an actuator connected to the MR head for moving the MR head across the magnetic recording disk, and a mechanism for moving the disk relative to the MR head.

MR sensors and disk drives made according to the various embodiments of the present invention exhibit edge definitions with narrow track widths suitable for future high density magnetic recording products.

BRIEF DESCRIPTION OF THE FIGURES

FIGS. 3C depicts a schematic diagram of fabrication of MR sensors using an ion beam projection system according to an alternative embodiment of the present invention;

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
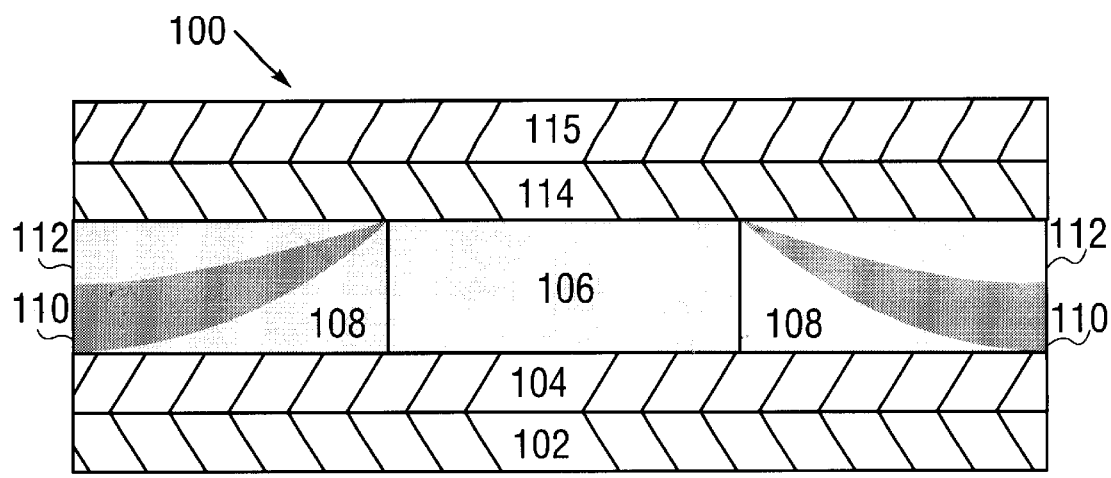
FIG. 1 depicts a schematic diagram of a MR structure according to the prior art.
Figure 2:
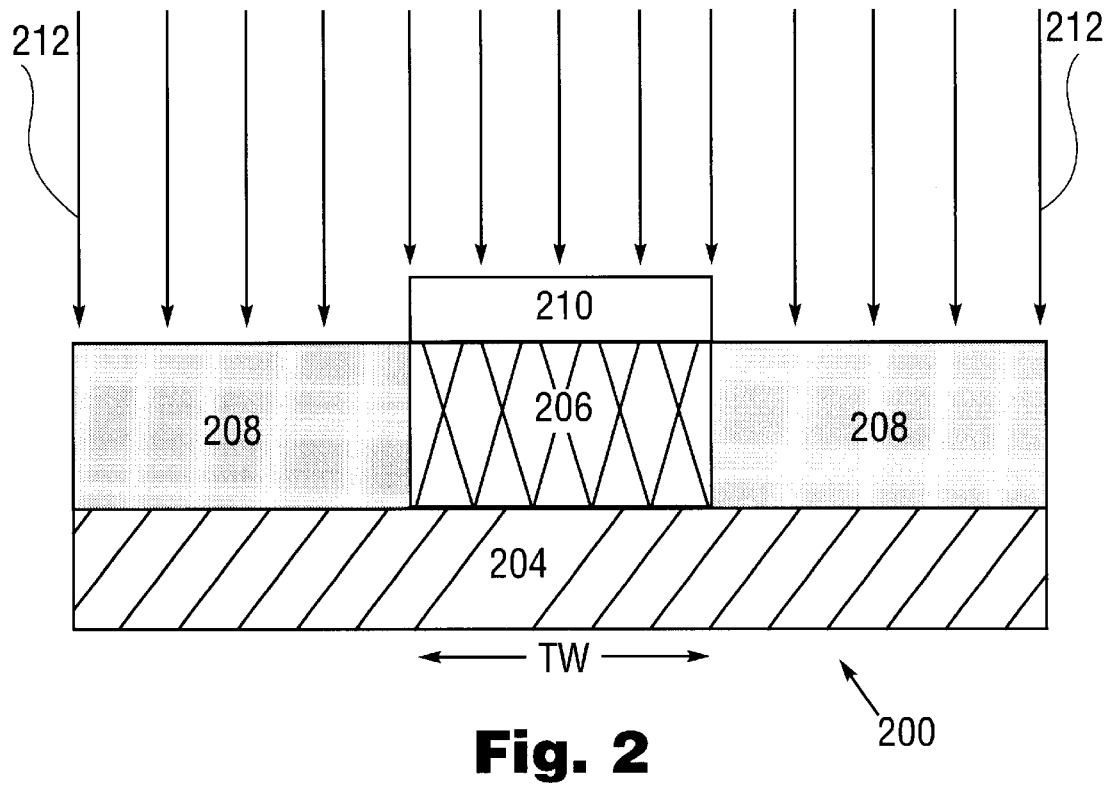
FIG. 2 depicts a schematic diagram of a fabrication of a MR structure according to a first embodiment of the present invention.

FIG. 2 depicts a cross-sectional schematic diagram of fabrication of a MR structure 200 according to a first embodiment of the present invention. MR structure 200 includes a thin film of magnetoresistive (MR) material, which includes portions 206 and 208, disposed on a substrate 204 which may include an insulating gap layer and/or a magnetic shield layer. A mask 210 covers the portion 206, which is a defined sensor of MR structure 200. The unmasked portions 208 are exposed to the ions 212. The ions irradiate and/or implant into the unmasked portions 2 0 8 and reduce the magnetoresistance of these portions while leaving the masked portion 206 substantially unaltered. However, the unmasked portions 208 are still electrically conducting, which may be used as the lead, or as part of the lead structure. This technique is preferred for implantation since the ion-treated material may be non-magnetic, which may minimize side-reading effects.

Figure 3A:
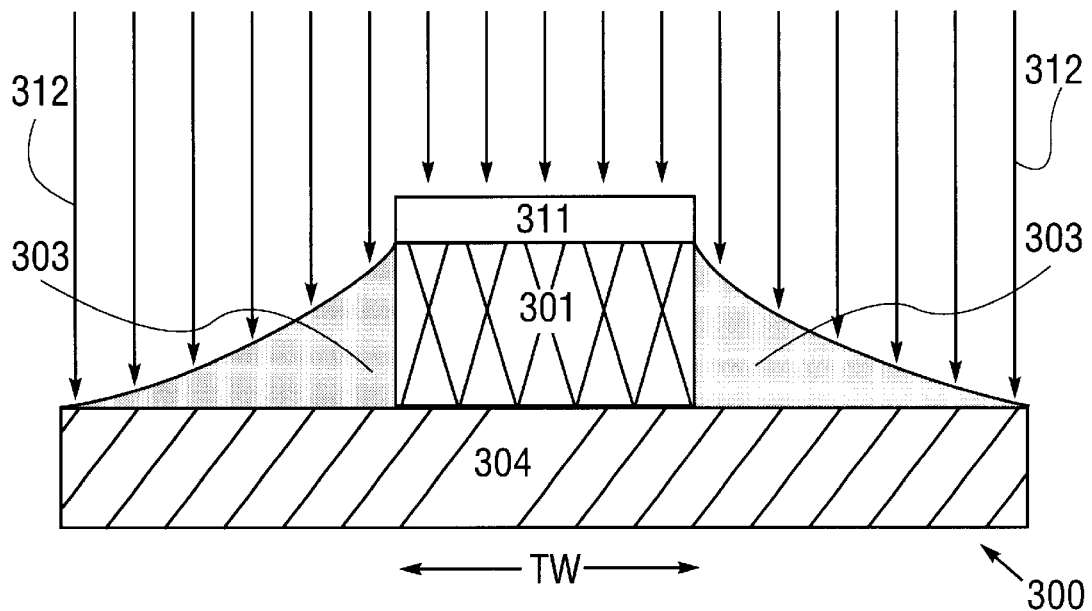
FIG. 3A depicts a schematic diagram of fabrication of a MR structure in which an ion beam mill step is used in addition to an ion irradiation/implantation step according to an alternative embodiment of the present invention.

The mask may be made of a resist deposited on the surface of a MR structure as shown in FIG. 3A. The resist may be patterned using optical or electron-beam lithography. Alternatively, a stencil mask may be used. Stencil masks can be made from Si or any other suitable material, by any convenient technique, such as optical lithography, electron beam lithography, focused ion beam lithography, or projection ion beam lithography. With a suitable mask it would also be possible to make the sensor shown in FIG. 2 using projection ion beam lithography, wherein the ion beam is focused after passing through the mask. This approach offers the advantage that the patterns in the mask can be considerably larger than the patterns projected on to the MR film which define the sensor structure. FIG. 3A illustrates a cross-sectional schematic diagram of fabrication of a MR sensor 300 with a mask 311 for patterning and irradiation/implantation with ions according to an alternative embodiment of the present invention. MR sensor 300 includes a MR structure containing a defined sensing element 301 and tails 303, which are disposed on a substrate 304. The mask 311 covers a selected portion of the MR structure to define the sensing element 301. The combined structure of the defined sensing element 301 and tails 303 has been produced by ion milling in conjunction with the mask 311. The unmasked portions of the MR structure, e.g., the tails 303, are exposed to the ions 312. The ions 312 irradiate and/or implant into the unmasked portions 303 and reduce the magnetoresistance of these portions while leaving the masked portion 301 substantially unaltered. The irradiation and/or implantation does not affect the magnetization of the masked portion 301, thus the sensor is defined. A design TW of the sensing element 301 may be achieved depending on the size of the mask 311.

Figure 3B:
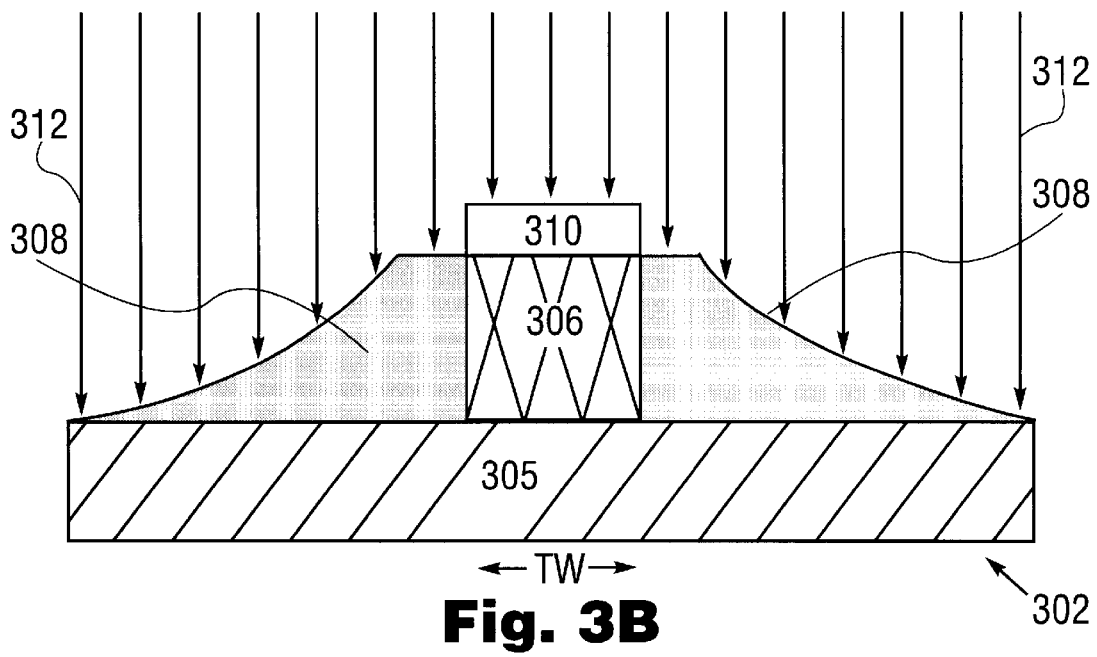
FIG. 3B depicts a schematic diagram of fabrication of a MR structure in which one mask is used in conjunction with an ion mill step to grossly define the sensing element and a second, smaller mask is used to define the TW via ion irradiation/implantation according to an alternative embodiment of the present invention.

FIG. 3B illustrates an alternative process for defining a sensor in which the sensing structure is grossly defined in a first step using a mask which is subsequently removed. In a second step, illustrated here, a smaller mask is used in conjunction with ion irradiation/implantation to destroy the MR in the tails of the sensing structure, thus defining the TW dimension. As shown in FIG. 3B, MR sensor 302 includes sensing element 306 and tails 308, disposed on substrate 305, which are produced from a continuous thin MR film using a conventional ion beam milling process in conjunction with a first mask (not shown here). Alternative milling or etching processes could be used at this step. A second mask 310 is inserted between the MR sensor 302 and a source of ions 312. Unmasked portions such as the tails 308 are exposed to the ions 312. The ions irradiate or implant into the unmasked portions thereby reducing the magnetoresistance of the unmasked portions. The reduced magnetoresistance, e.g., in the tails 308, defines the TW edge of the sensing element 306. A designed TW of sensing element 306 is achieved depending on the size of the mask 310.

Alternatively, a sensor with tails resulting from a conventional ion milling process of a MR sensor may be further defined with a projection ion beam system, as shown in FIG. 3C. In FIG. 3C, a MR sensor 332 includes a MR structure containing a defined sensing element 315 and tails 317, which are disposed on a substrate 304. A rigid mask 314 made from Si or any other suitable materials is suspended between the MR structure and a source of a collimated beam of ions 312. Portions of the mask 314 block the ions from striking one or more selected portions 315 of the MR structure. Ion optics 316 focus the ions 312 onto unmasked portions 317 of the sensor 332. The beam of ions 312 projects onto the unmasked portions 317. Ion irradiation and/or implantation of the unmasked portions 317 reduces the magnetoresistance of the unmasked portions 317 and, thus, defines the sensing element 315. A designed TW of the sensing element 315 may be achieved depending on a distance between the mask 314 and the surface of the MR sensor 332, the properties of the ion optics, e.g., focal length, and the size of features in the mask 314.

The technique of using ion irradiation and/or implantation to define the TW as described in FIGS. 2 and 3A–3C may be used for fabricating GMR sensors, such as spin valves, MTJ sensors, or any magnetic multi-layer sensor structure. These processes use a broad collimated ion beam and masks to perform TW definition and allow TW definition of all the sensor elements on a wafer simultaneously, maximizing the manufacturing throughput and minimizing cost. Since the ion beam may be applied to a continuous film at the wafer level, the electrostatic discharge (ESD) problem is circumvented. In addition, the ions impinge on the sensor in the direction normal to the magnetic layers of the unmasked portions, and need only penetrate a short distance to do the requisite damage to those layers. Therefore, the ion energy required is low, minimizing milling during irradiation/implantation, thus maintaining a planar geometry suitable for following process steps in the manufacturing flow.

Fabrication using stencil masks may be preferred over fabrication using photoresist masks since the photoresist mask must be cleaned off the surface after patterning, adding a process step, while the use of a stencil mask adds no cleaning step. Projection ion beam patterning offers the same advantage.

In the case of irradiation, the passage of the ions through the sensor can be highly constrained spatially by choice of suitable ions and energies. As a result, the edges of the sensor can be defined to greater precision than is possible using currently available ion milling techniques, irrespective of the nature of the mask used. In order to maximize the sharpness of the pattern made by the ions, the ion species and energy must be selected such that the lateral scattering of ions beneath the mask edge is minimal while the required ion dose is achieved. Usually, this is accomplished by selecting low-Z ions, such as $He^{30}$, having a small projected range in the magnetic layer. In previous studies, the parameters of ion beams for which the magnetic response is suitably modified, such as $He^+$ at 30 keV, are consistent with low lateral spreading. The small amount of lateral scattering of the ions in the sensor film, together with the lack of physical etching, results in a sensor with essentially vertical edges rather than with the tails found in the current products. This significantly improves the performance of the MR heads that incorporate these sensors.

The processes of fabricating MR sensors depicted in FIGS. 2 and 3A–3C provide several other advantages. The coercivity of the hard bias layer may be increased by ion exposure since ion irradiation and/or implantation of magnetically soft thin films can cause the thin films to become magnetically harder. Thus in addition to defining TW of the sensor, the ion irradiation and/or implantation processes can be optimized to induce a suitable coercivity in the film to each side of the sensor, providing a hard bias layer which abuts the sensor in an ideal manner.

Figure 4A:
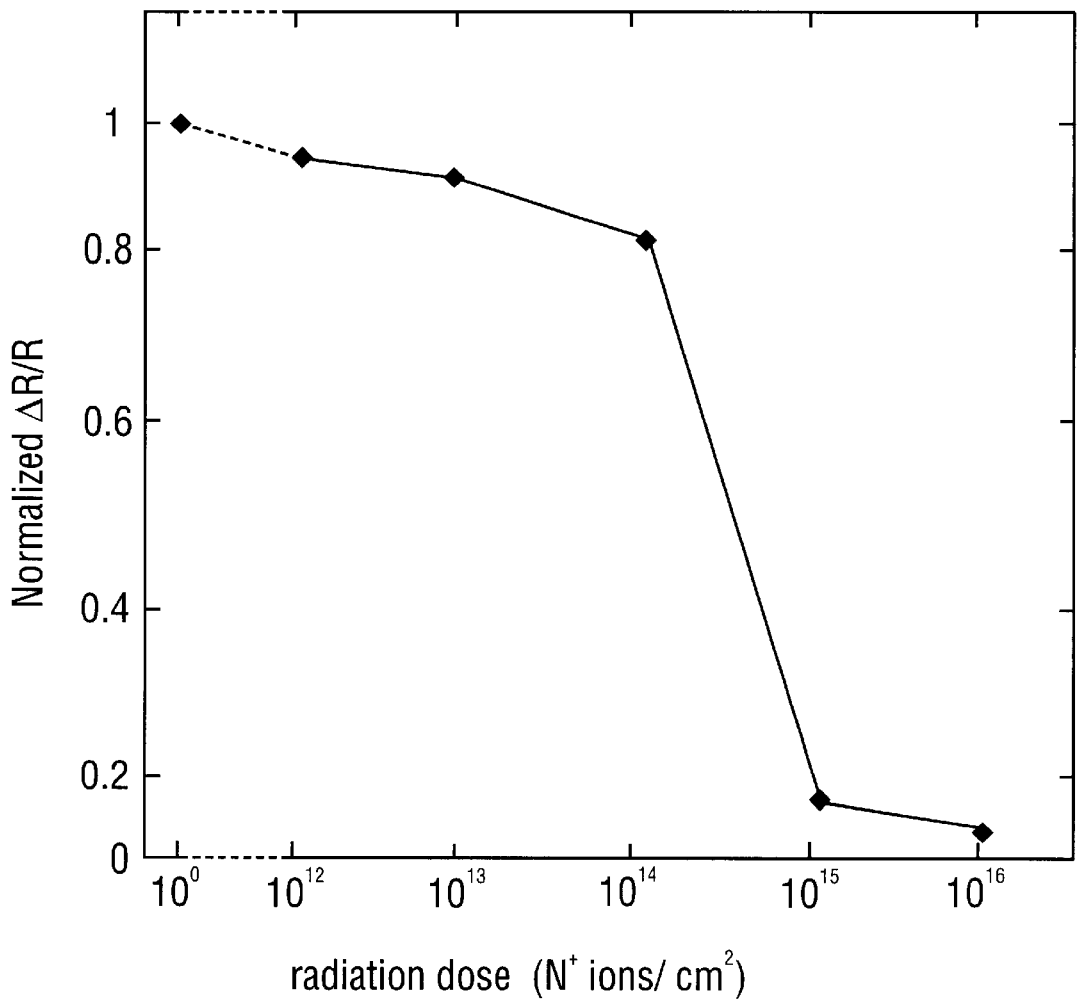
FIG. 4A depicts a plot showing the effect of irradiation with 700 keV N$^+$ ions on the normalized magnetoresistance ($\Delta R/R$) of a NiMn-based multilayer.

The effect of the ion irradiation on the magnetoresistance of the unmasked portions of MR sensors is described in FIG. 4. specifically, FIG. 4A depicts a plot of the normalized magnetoresitance ($\Delta R/R$) of the unmasked portions of a NiMn-based multilayer MR structure with a flux of $N^+$ ions at 700 keV and at a range of dose up to $10^{16}$ ions/$cm^2$. Over this range, the magnetoresistance $\Delta R/R$ is observed to fall to around 3% of the magnetoresistance of the as-produced structure. This effect also occurs with other spin valve and magnetic tunnel valve structures including NiO.

Alternatively, controlled doping of the MR sensor with Cr, V, Al, Mo or similar elements also serves to greatly reduce the MR signal from the implanted area and thus may also be used to define the TW.

Figure 4B:
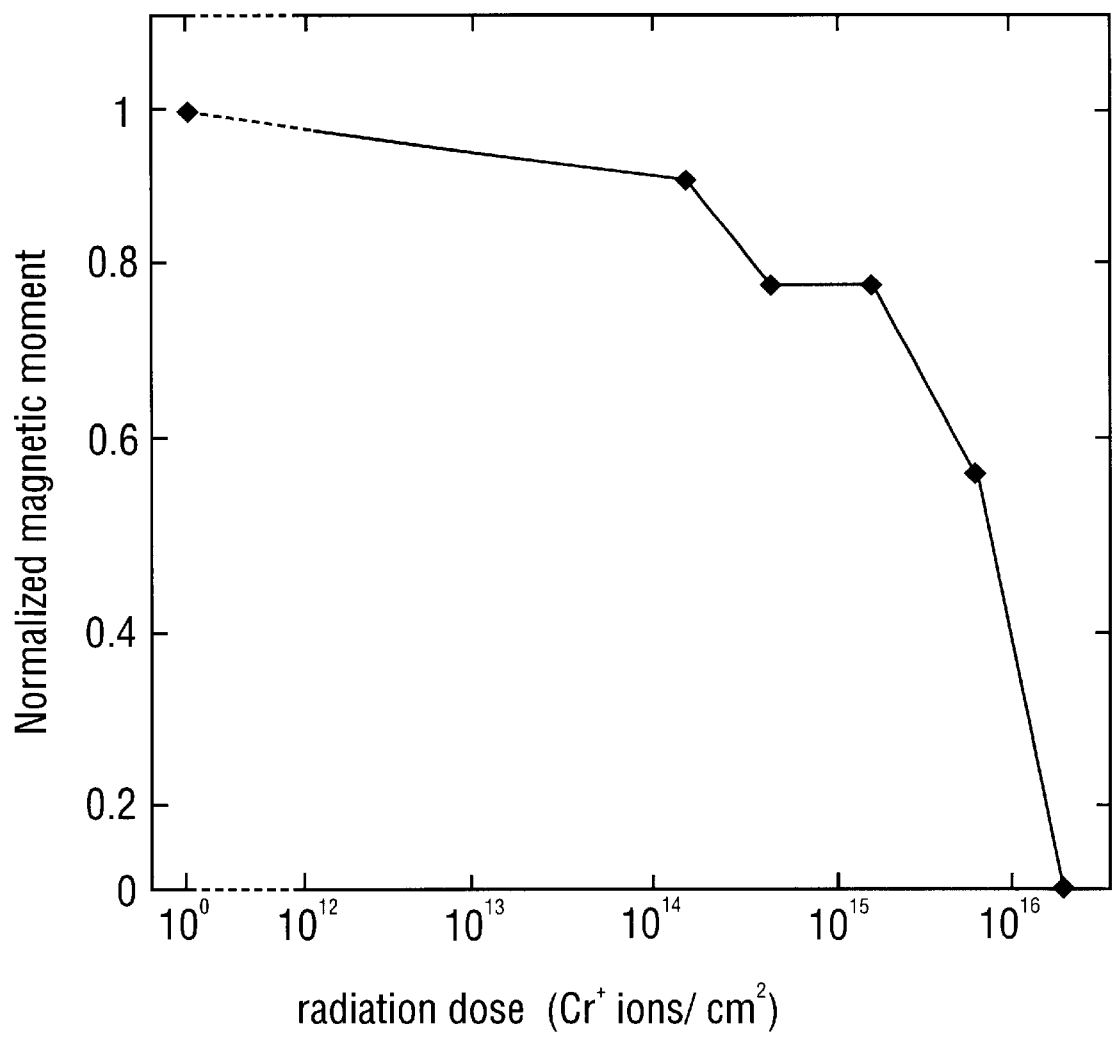
FIG. 4B depicts a plot showing the effect of implantation on the normalized magnetic moment of a multilayer MR structure.

The ion irradiation reduces magnetoresistance $\Delta R/R$ of the unmasked portions of MR sensors, without substantially reducing the magnetic moment. The magnetic moment, and thus the magnetoresistance $\Delta R/R$, of the unmasked portions may be reduced to zero by ion implantation, thus minimizing the side-reading effect of the unmasked material adjoining the sensor since it is no longer magnetic. An example is given below to show the effect of the ion implantation on the magnetic moment and the magnetoresistance $\Delta R/R$ of spin valves. An exemplary spin valve with a complete structure denoted by Si/Ru (20 Å)/NiFe(20 Å)/IrMn(80 Å)/CoFe(13 Å)/NOL/CoFe(25 Å)/Cu(25 Å) /$co_9$ $Fe_{10}$(5 Å)/$Ni_{80}Fe_{20}$(40 Å)/Ru(50 Å) includes a substrate of Si, two seed layers of Ru 20 Å thick and NiFe 20 Å thick, an antiferromagnetic layer of IrMn 80 Å thick, a pinned layer containing a first layer of CoFe 13 Å thick, a nano-oxide layer NOL, and a second layer of CoFe 25 Å, a spacer layer of Cu 25 Å thick, a free layer containing a layer of $Co_{90}Fe_{10}$ 25 Å thick and a layer of $Ni_{80}Fe_{20}$ 40 Å thick, and a overcoat layer of Ru 50 Å thick. This sample was irradiated with $Cr^+$ ions at dose between $2\times10^{14}$ and $2\times10^{16}$ ions/$cm^2$. The $Cr^+$ ion energy, 20 keV, was chosen so as to stop most of the ions in or near the free layer, as determined from a simulation of the implantation process. The Ru overcoat layer may be diminished somewhat by milling at the high $Cr^+$ doses, but this effect may be minimized by using a low-Z element as the overcoat material. The pre-implantation magnetoresistance $\Delta R/R$ value of the sample was about 10%. The $\Delta R/R$ value dropped rapidly with increasing dose, and reduced essentially to zero after about a monolayer coverage of ions (about $3\times10^{15}$ ions/$cm^2$). As shown in FIG. 4B, which depicts a plot of normalized magnetic moment of the unmasked portions of a MR multilayer structure as a function of $Cr^+$ ion dose, the total moment of the films dropped to zero after about 4 monolayers of ions (about $2\times10^{16}$ ions/$cm^2$). The loss of magnetic moment likely occurs because doping with $Cr^+$ drives the Curie temperature below room temperature, transforming layers in the film from ferromagnetic to paramagnetic at room temperature. The $Cr^+$ ions caused a massive intermixing of the atoms in the multilayers, as well as the loss of some overcoat Ru to sputtering.

The sensor magnetoresistance $\Delta R/R$ can also be increased in the process of patterning TW by ion irradiation, since for some magnetoresistive multilayer (ML) systems a small ion dose causes an increase in the magnetoresistance (MR). e.g. See (D. M. Kelly et al., Increases in giant magnetoresistance by ion irradiation in Physics Review B 50 3481 (1994)). Thus, by applying a low radiation dose to the entire film to increase the MR signal of the ML, and then inserting the mask over the element and continuing with the irradiation until the MR of the material surrounding the element is diminished to zero, a sensor with enhanced MR is shaped.

Figure 5A:
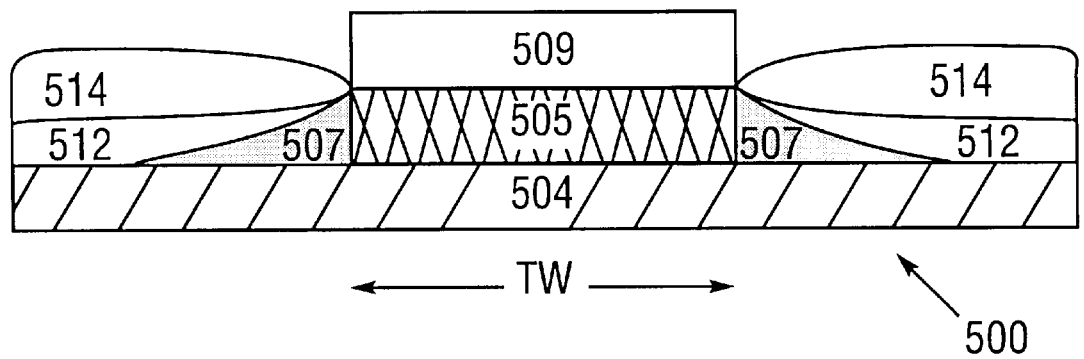
FIGS. 5A–5E depict schematic diagrams of sensor stabilization according to a second embodiment of the present invention.

The ion beam parameters will typically be selected to optimize the change of magnetic properties of the bombarded sensor layers. Preferably, the chosen ion beam parameters also facilitate such ideals as low ion dose (short processing time), low sputtering damage to the mask, economical ion beam generation (low energy, typically <100 keV), large beam area and freedom from debris. The effect of the ions on the magnetic properties may, in some multilayer sensors, depend only on the energy loss processes as the ion passes through the ML, or different changes may be achieved by implantation to alter the phase structure or chemistry of the sensor layers themselves. The ion species and energy will determine whether the ion stops within the sensor (implantation) or outside (irradiation). The important mode of ion-solid interaction may be the ionization energy deposited at the MR interfaces by the passing ion, or alternatively it might be the rate of collisional energy transfer. Furthermore, the requisite amount and form of energy transfer may be equally well provided by almost any ion species, given enough energy to pass through the ML. Typically, the ion energy chosen could be in the range from about 10 keV to about 1 MeV. If the ion is implanted to alter the ML composition, the ion species are predetermined, so the energy will be chosen to lodge the ions within the ML, which may be in the range from about 10 keV to about 1 MeV. All the ion energy deposition and stopping characteristics may be predicted by the Monte Carlo simulation software TRIM (J. P. Biersack and L. Haggmark, Nuclear Instrument and Methods in Physics Research 174 257 (1980)). A person with average skill in the art will be familiar with the choice of ion species and ions energies for the irradiation or implantation in a target material typical of MR sensors using Monte Carlo software. According to a second embodiment of the present invention, the magnetization of a MR sensor may be stabilized by using longitudinal bias for improvement of the sensor performance. FIG. 5A shows a schematic diagram of a MR sensor 500. MR sensor 500 includes a sensing element 505 with tails 507, shaped from a continuous film using ion beam milling process in conjunction with the mask 509, located on a substrate 504. The shape of the sensing element 505 and the TW are defined with an ion implantation/irradiation process using mask 509. The magnetization of sensing element 505 is conventionally stabilized by hard bias layers 512 adjacent to both sides of the sensor 505. Two leads 514 are disposed over the hard bias layers 512 for transmitting electrical signals. However, the hard bias layers 512 may become very thin near the top surface of the sensing element 505 and/or may not closely abut the sensing element 505, leading to poor sensor performance.

Figure 5B:
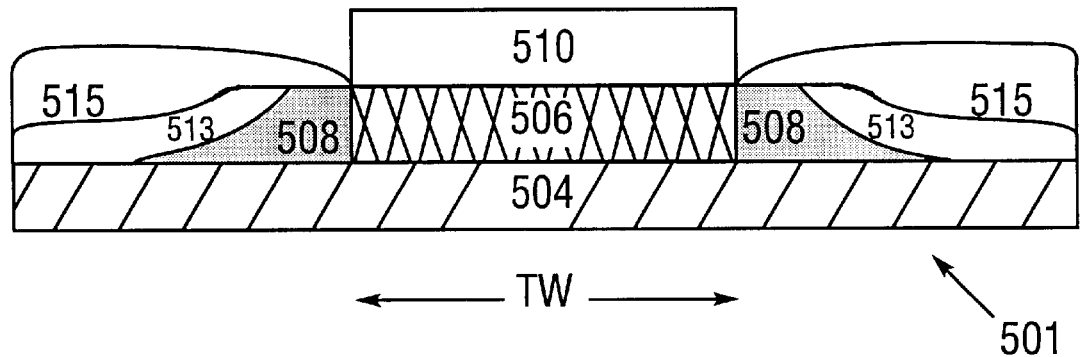

FIG. 5B illustrates a schematic diagram of a MR sensor 501 including a sensing element 506 with the tails 508 located on a substrate 504. The TW of the sensing element 506 is defined by introducing an extra mask 510 for ion implantation/irradiation process. This mask is smaller than the mask used for the milling step of patterning the combined structure of sensing element 506 and tails 508. Two leads 515 overlay on the hard bias layers 513 adjacent the sensor 506, which transmit the electrical signals. Hard bias layers 513, which are magnetically coupled to the tails 508, abut and bias the sensing element 506.

Figure 5C:
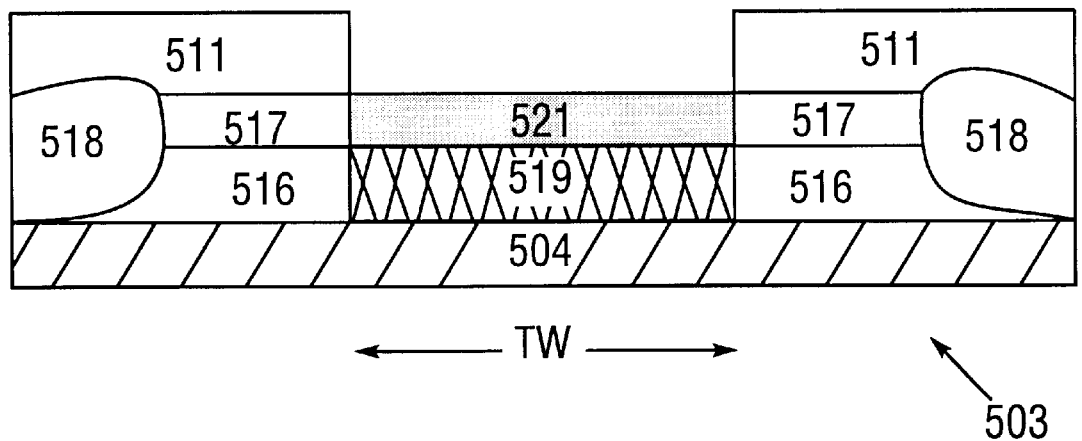

Alternatively, the magnetization of the sensor of a MR sensor may be stabilized by using an anti-parallel (AP) pinning layer as shown in FIG. 5C. FIG. 5C depicts a schematic diagram of a MR sensor 503 including a sensing element 519 with tails 516 located on a substrate 504. An AP pinning layer including portions 517 and 521 is deposited on the sensor layer. Portion 521 is implanted with ions of species and energy such that the magnetic coupling between portion 521 and underlying portion 519 is destroyed, thus freeing portion 519 to behave as a sensing element. The TW of the sensing element 519 is defined by introducing extra masks 511 on the portions 517 of the AP pinning layer for protecting these portions 517 from the ion implantation process separately from the milling step of patterning the MR structure. These portions 517 of the AP pinning layer couple with the free layer of the sensor layer in portions 516, thus these portions 516 are no longer acting like a sensor. Portions 516 and portions 517 stabilize the ends of the sensing element 519, which improves the sensing element 519 performance. The masks 511 also cover leads 518 disposed adjacent the portions 516 of the sensor layer and the portions 517 of the AP pinning layer.

Figure 5D:
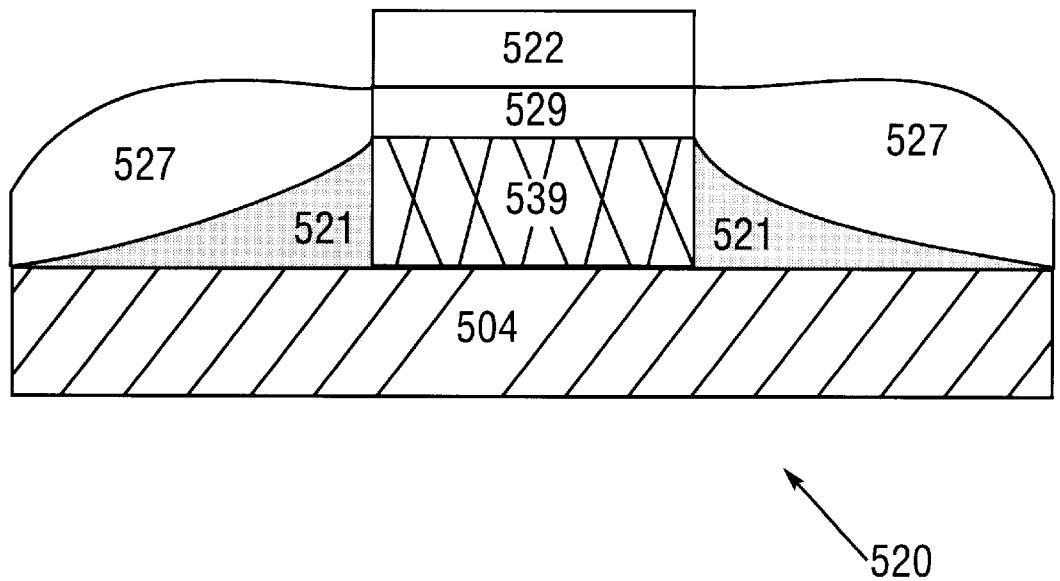
Figure 5E:
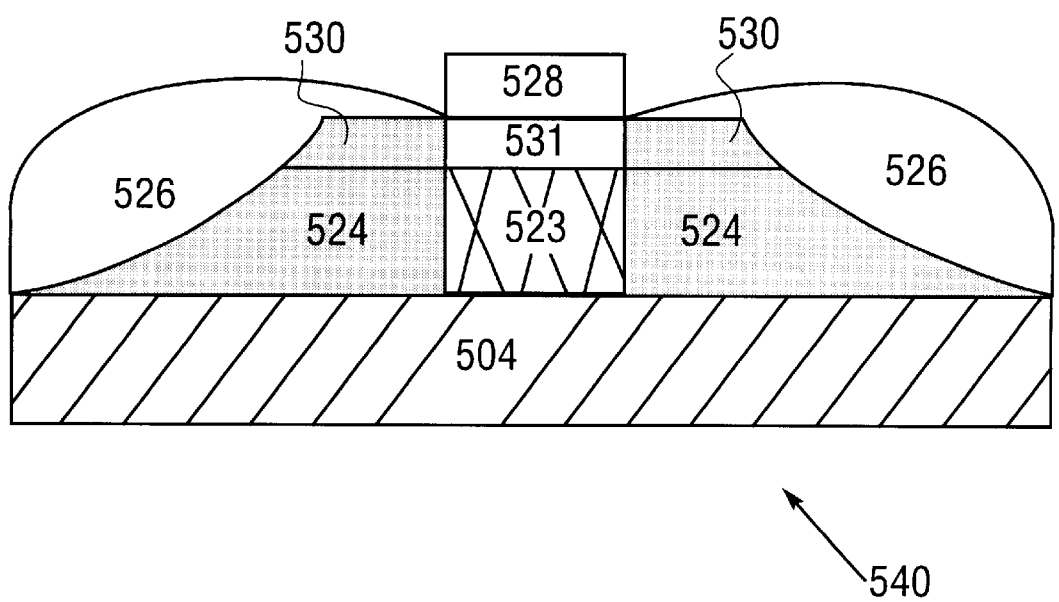

Furthermore, the magnetization of a MR sensor may be stabilized by using an in-stack antiferromagnetic (AF) layer as shown in FIGS. 5D–E. FIG. 5D depicts a schematic diagram of a MR sensor 520 including a sensing element 539 with tails 521 located on a substrate 504. Two leads 527 may be disposed adjacent to the tail 521 for transmitting electrical signals. An in-stack AF layer 529 is disposed on the sensing element 539. The TW of the sensing element 539 may be defined by introducing a mask 522 on the AF layer 529 for an ion implantation/irradiation process following a milling step of patterning the MR structure. The AF layer 529 stabilizes the magnetization of the sensing element 539.

FIG. 5E illustrates an alternative schematic diagram of a MR sensor 540 having the magnetization of the sensor stabilized by using an in-stack AF layer. MR sensor 540 includes a sensing element 523 having tails 524 located on a substrate 504. An AF layer having a first portion 531 covers the sensing element 523 and a second portion 530 disposed on the tails 524. The TW of the sensing element 523 may be defined by introducing an extra mask 5 2 8 for an ion implantation/irradiation process separate from a milling step of patterning the MR structure. Two leads 526 are disposed adjacent the tails 524 and the portion 530 of the AF layer for transmitting electrical signals. The portion 531 of the AF layer stabilizes the magnetization of the sensing element 523.

Figure 6:
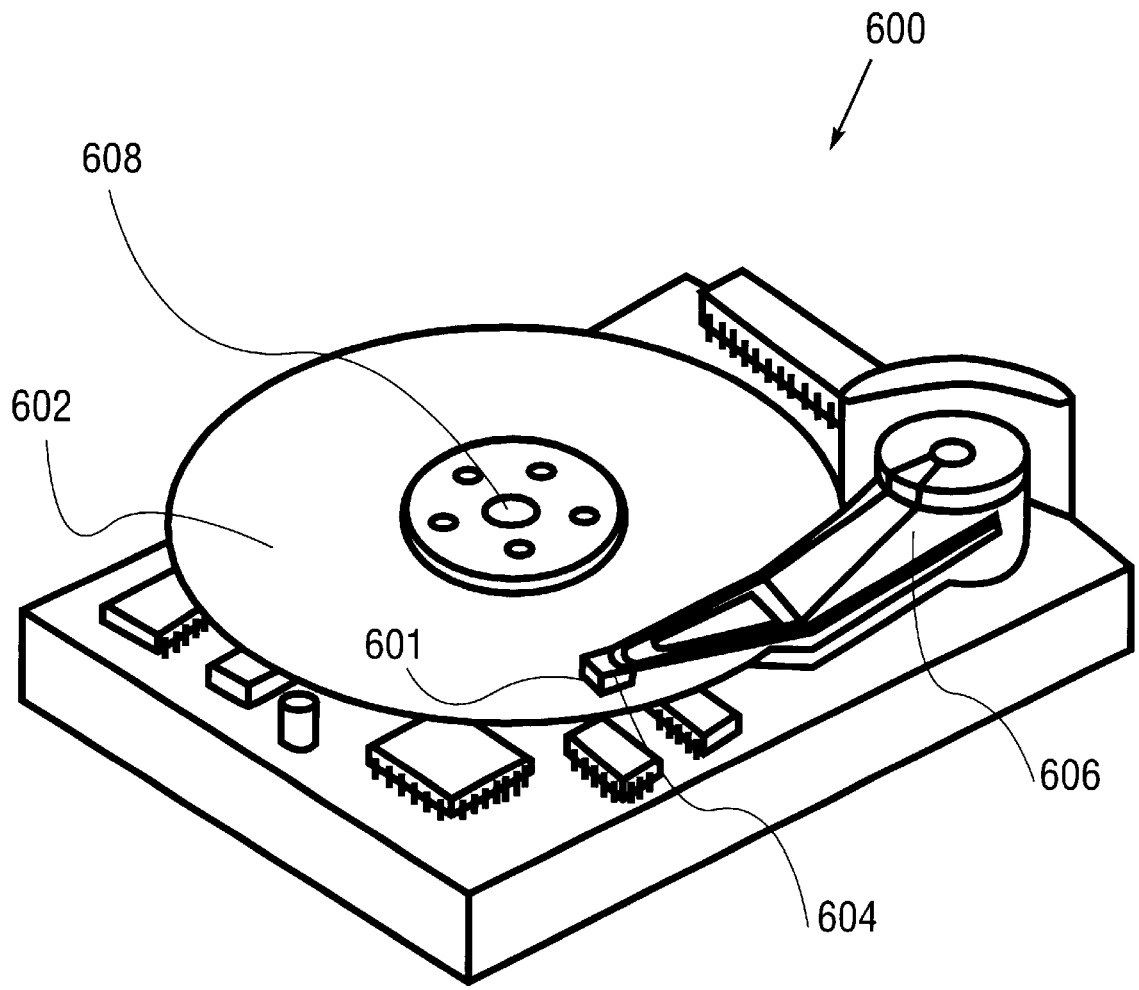
FIG. 6 depicts a schematic diagram of a disk drive according to a third embodiment of the invention.

MR heads incorporating MR sensors of the types depicted in FIGS. 2, 3A–3C, and 5A–5E may be incorporated into disk drives. FIG. 6 depicts a schematic diagram of a disk drive 600 according to a third embodiment of the present invention. The disk drive 600 includes a magnetic recording disk 602, a MR head 604 with MR sensor 601 having features in common with the MR sensors described above with respect to FIGS. 2, 3A–3C, and 5A–5E, an actuator 606 connected to the MR head 604, and a mechanism 608 connected to the disk 602. The mechanism 608 moves the disk 602 with respect to MR head 604. The actuator 606 moves the MR head 604 across the magnetic recording disk 602 so the MR head 604 may access different regions of magnetically recorded data on the magnetic recording disk 602.

It will be clear to one skilled in the art that the above embodiment may be altered in many ways without departing from the scope of the invention. Accordingly, the scope of the invention should be determined by the following claims and their legal equivalents.

What is claimed is:

1. A magnetoresistive sensor, comprising: a magnetoresistive structure including one or more ferromagnetic layers that have been exposed to ions through a mask to substantially reduce a magnetoresistance substantially near room temperature while leaving the magnetoresistive structure substantially intact.

2. The sensor of claim 1, wherein a portion of the magnetoresistive structure that has not been exposed to ions defines a magnetoresistive sensing element.

3. The sensor of claim 1, wherein the ions have been implanted into one or more of the ferromagnetic layers.

4. The sensor of claim 1, wherein the ions have irradiated one or more of the ferromagnetic layers.

5. The sensor of claim 4, further comprising:
   i) a stabilizing layer disposed adjacent the magnetoresistive_structure to stabilize the magnetization of the sensor; and
   ii) a lead, disposed over the stabilizing layer, the lead being in electrical contact with the magnetoresistive_structure.

6. The sensor of claim 5, wherein the stabilizing layer is a hard bias layer.

7. The sensor of claim 5, wherein the stabilizing layer is an AP pinning layer.

8. The sensor of claim 4, further comprising an in-stack antiferromagnetic (AF) layer.

9. The sensor of claim 1 is an anisotropic magnetoresistive sensor.

10. The sensor of claim 1 is a giant magnetoresistive sensor.

11. The sensor of claim 1 is a magnetoresistive tunnel junction sensor.

12. A disk drive, comprising:
   a) a magnetic recording disk;
   b) a magnetoresistive head comprising a magnetoresistive sensor;
   c) an actuator for moving the magnetoresistive sensor across the magnetic recording disk; and
   d) a mechanism for moving the magnetic recording disk relative to the magnetoresistive head; wherein the magnetoresistive sensor includes: a magnetoresistive structure including one or more ferromagnetic layers that have been exposed to ions through a mask to substantially reduce a magnetoresistance substantially near room temperature while leaving the magnetoresistive structure substantially intact.

* * * * *